United States Patent [19]

Kendzior

[11] 4,145,811
[45] Mar. 27, 1979

[54] RECIPROCATING SAW

[75] Inventor: Leo J. Kendzior, Meriden, Conn.

[73] Assignee: Jarvis Products Corporation, Middletown, Conn.

[21] Appl. No.: 846,684

[22] Filed: Oct. 31, 1977

[51] Int. Cl.² .................. B23D 49/12; A22B 5/20
[52] U.S. Cl. .................................. 30/394; 17/23; 83/748
[58] Field of Search ............... 30/392, 393, 394; 83/748; 17/23; 74/44, 51, 590, 591, 61; 308/77

[56] References Cited

U.S. PATENT DOCUMENTS

| | | | |
|---|---|---|---|
| 2,573,573 | 10/1951 | Jenkins | 30/394 |
| 2,895,514 | 7/1959 | Wright | 83/748 X |
| 2,924,106 | 2/1960 | Bohm et al. | 74/44 |
| 2,949,944 | 8/1960 | Blachly | 83/748 X |
| 3,155,128 | 11/1964 | Godfrey et al. | 83/748 |
| 3,266,534 | 8/1966 | Carnesecca, Jr. et al. | 30/394 X |
| 3,729,823 | 5/1973 | Bos et al. | 74/44 X |
| 3,832,772 | 9/1974 | Sumida | 30/392 |
| 4,031,622 | 6/1977 | Alexander | 30/392 |
| 4,038,721 | 8/1977 | Kendzior | 17/23 |

Primary Examiner—Frank T. Yost
Attorney, Agent, or Firm—DeLio and Montgomery

[57] ABSTRACT

A reciprocating blade saw wherein the counterbalancing of the drive system includes the provision of two directly opposed and coaxial rams, one attached to the saw blade and the other having a mass equal to the first ram plus the blade, both being attached to a crankshaft by links which have their masses symmetrically distributed. The crankshaft is driven by a hydraulic motor, and all the masses are so matched that the saw is in balance at all speeds and can be operated at high speeds with minimal vibration. The saw is designed for use particularly in the meat industry.

7 Claims, 6 Drawing Figures

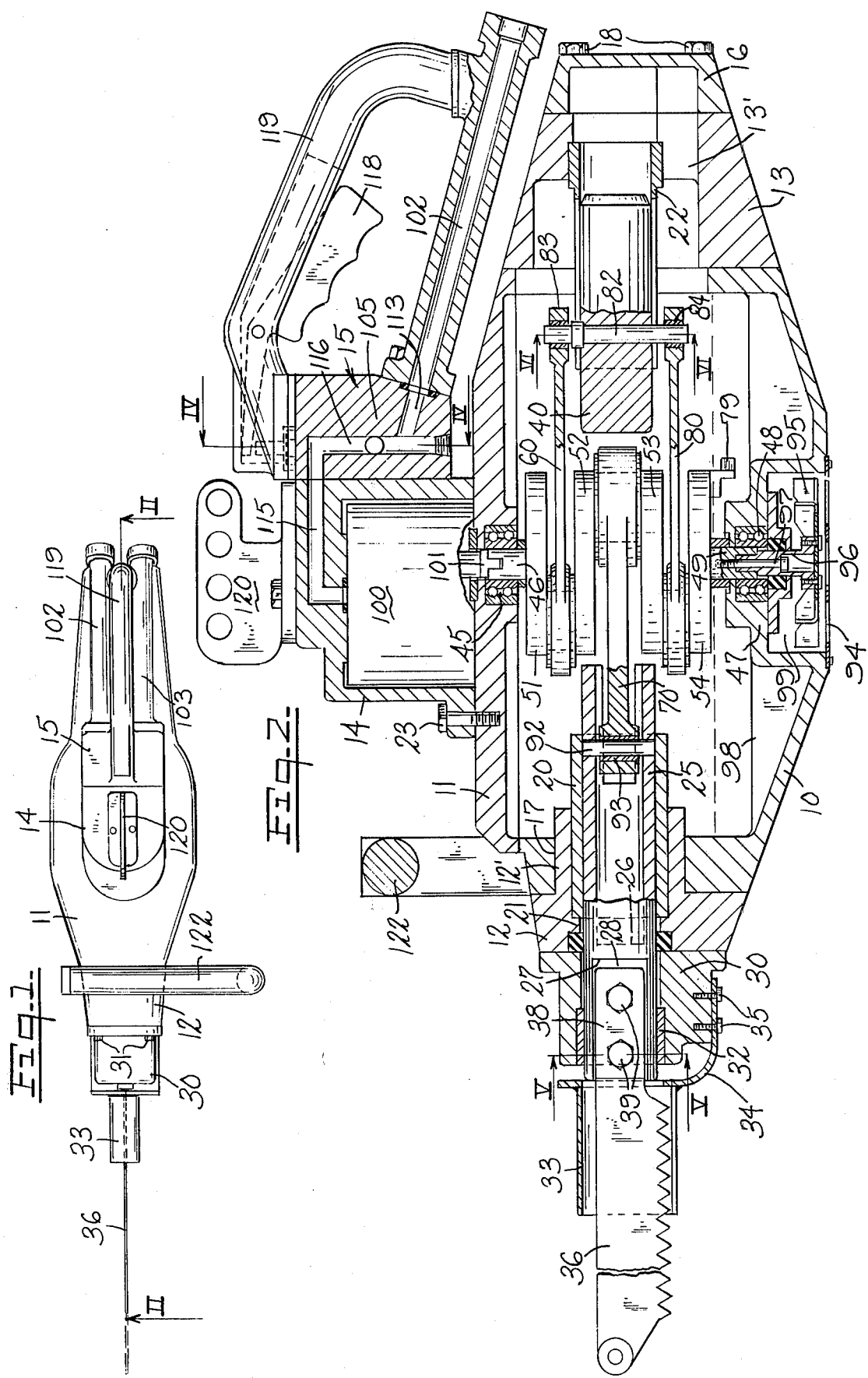

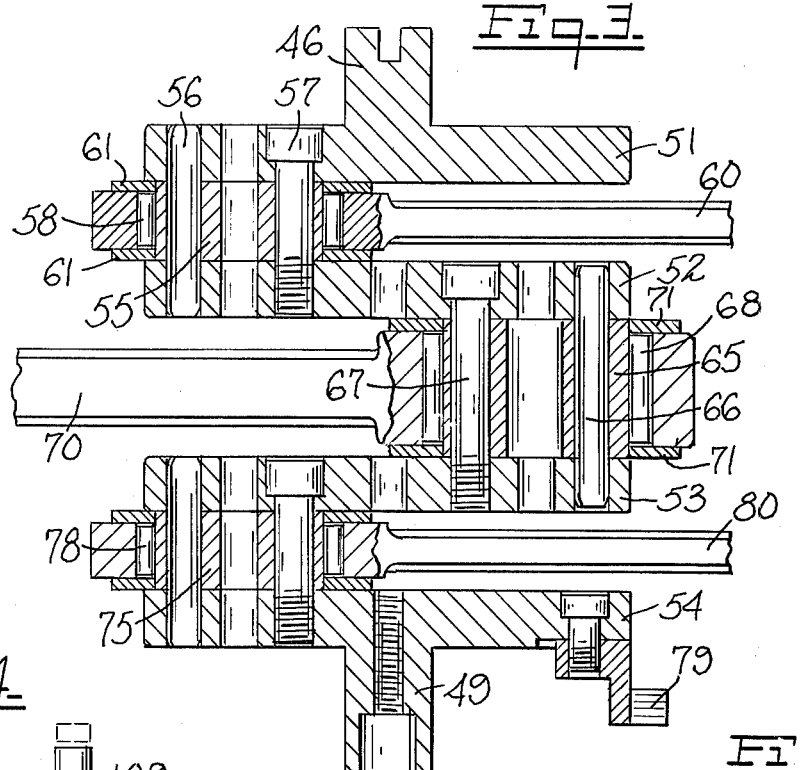
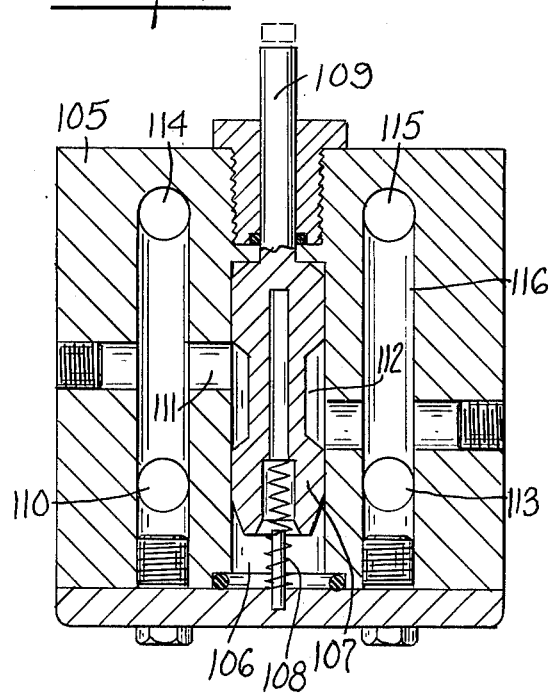
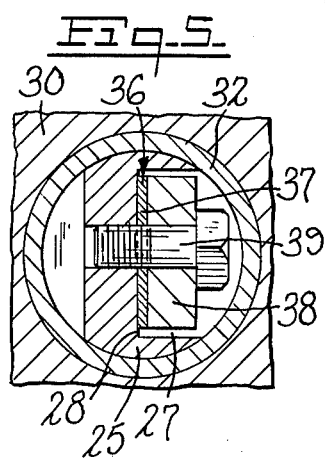
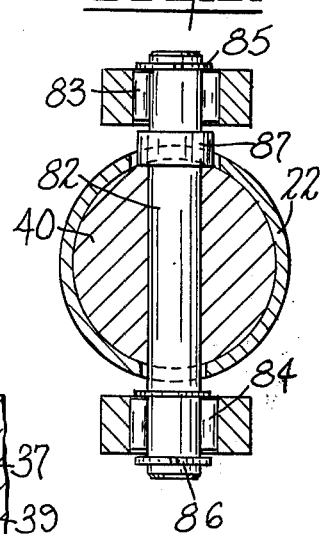

RECIPROCATING SAW

This invention relates to a reciprocating drive saw with improved counterbalancing system designed to minimize vibration at all speeds by the provision of two directly opposed and coaxial rams, one attached to the saw blade and the other having a mass equal to the first ram plus the blade, both being attached to a crankshaft by links which have their masses symmetrically distributed. The crankshaft is driven by a hydraulic motor, and all the masses are so matched that the saw is in balance at all speeds and can be operated at high speeds with minimal vibration. The saw is designed for use particularly in the meat industry.

A heavy duty high speed saw of the type designed for meat industry use comprises a housing, a blade up to about 30 inches long, a motor (usually hydraulic), and a drive train between the motor and blade for reciprocating the blade at speeds up to 2000 RPM or more. The blade may be supported or unsupported at its free end, opposite the drive connection, depending on size and intended use, examples of supported blades being shown in applicant's prior U.S. Pat. Nos. 4,027,290 and 4,038,721.

In a reciprocating saw of any substantial size it is essential to arrange for counterbalancing of the simple and complex vibrations generated by the linear and rotational movements of the mechanism, and efforts to overcome this problem are reflected in applicant's U.S. Pat. No. 4,038,721, cited above, as well as in the Mandell U.S. Pat. No. 3,270,369, Bos et al. U.S. Pat. No. 3,729,823 and others. In Bos et al. a hydraulic motor drives a crankshaft having closely spaced opposed crank throws with connecting rods, one reciprocating a tubular drive member for the blade and the other reciprocating, in opposite phase, a cylindrical counterweight within the tubular member. In applicant's prior patent the counterbalancing involved use of an oscillating mass on a lever and in Mandell (owned by applicant's assignee) eccentric counterweights were used.

It is an object of this invention to provide a saw with a substantially different and improved counterbalancing means.

This saw has two directly opposed rams or pistons moving in opposite directions. The forward ram has attached to it a saw blade and is supported in bearings to support the cutting thrust and the reciprocating movement of the ram.

The rear ram is essentially a counterweight of the same weight as the combined blade and forward ram, and it is supported and guided in bearings.

The reciprocating movement is generated and controlled by a three journal crankshaft with the center journal being 180° opposite the two outside journals. The forward ram is attached to a connecting link and is driven by the center journal.

The rear ram, or counterbalancing ram, is attached to two links and is driven by the two outside journals.

It is a further object of the invention to provide counterbalance links which straddle the counterbalance ram and the drive link assembly in order to provide a balance condition which eliminates lateral coupling reactions.

It is another object of the invention to provide a saw which is in balance at all speeds.

It is a still further object of the invention to provide improved lubricating and cooling means for the mechanism.

It is a more general object of the invention to provide the industry with a quiet, smoothly operating and durable saw which is very safe to operate.

It is yet another object of the invention to provide certain improvements in the form, construction and arrangement of the several parts by which the above named and other objects may effectively be attained.

The invention accordingly comprises the features of construction, combination of elements, and arrangement of parts which will be exemplified in the construction hereinafter set forth, and the scope of the invention will be indicated in the claims.

A practical embodiment of the invention is shown in the accompanying drawings, wherein:

FIG. 1 represents a top plan view of the saw;

FIG. 2 represents a vertical medial section on the line II—II of FIG. 1, on a larger scale;

FIG. 3 represents an axial section through the crank assembly, the counterbalance links and drive link being broken away;

FIG. 4 represents a detail transverse section on the line IV—IV of FIG. 2;

FIG. 5 represents a detail transverse section on the line V—V of FIG. 2; and

FIG. 6 represents a detail transverse section on the line VI—VI of FIG. 2.

Referring to the drawings, the body of the saw comprises externally, the main housing 10, the housing cover 11, the front bushing housing 12, the rear bushing housing 13, the motor housing 14, the valve housing 15 and the rear cover 16. The front bushing housing 12 has a sleeve portion 12' fitted into an opening 17 at the front end of the main housing and the rear bushing housing 13 is firmly fixed to the rear end of the main housing by screws or the like, not shown, while the rear cover 16 is screwed to the rear open end of the housing 13 by screws 18.

The saw drive ram bushing 20 is fixed within the housing 12, stabilized forwardly by abutting against the annular shoulder 21 on the housing 12, and the counterbalance ram bushing 22 is fixed in a reduced diameter portion 13' of the rear bushing housing 13. The motor housing 14 is fixed to the top of the main housing by screws 23 and the valve housing is mounted on the rear of the motor housing by means of screws, not shown.

The saw drive ram 25 is shown as a hollow cylinder, closed at its front end by the wall 26, and provided with a forwardly extending channel portion 27 having a flat base 28, for mounting the saw blade. A front guard housing 30 is mounted on the forward wall of the front bushing housing 12 by screws 31, the front bushing 32 being set within the housing 30 as a bearing for the ram extension 27. A blade guard 33, inverted U-shaped in cross-section, is held in position to encase the rear end of the saw blade by means of the bracket 34, fixed to the front guard by screws 35.

The saw blade 36 has a mounting tab 37 which is held against the channel base 28 by means of a retaining plate 38 and two screws 39, as shown in FIGS. 2 and 5.

The counterweight ram 40 is a solid cylindrical body, slidable in the bushing 22, and so proportioned that its mass (weight) is equal to the total weight of the drive ram 25, saw blade 36, plate 38 and screws 39.

The housing cover 11 is provided with a ball bearing 45 for the upper stub axle 46 of the crank assembly and the main housing 10 is provided with a journal portion 47 in which is fitted the ball bearing 48 for the lower stub axle 49.

The crank assembly, shown on an enlarged scale in FIG. 3, comprises four coaxially mounted circular drive plates 51, 52, 53 and 54; the stub axles 46 and 49 being integral with the plates 51 and 54, respectively. Plates 51 and 52 are spaced by the solid cylindrical counterweight cam 55, the plates and cam being bored to receive one or more (preferably three) spiral pins 56 and one or more (preferably two) cap screws 57, the latter being countersunk into plate 51 and threaded into plate 52. Anti-friction means such as a needle bearing 58 is mounted on the cam 55, which serves as an inner race, and the counterweight link 60 has one end mounted on the needle bearing, between washers 61.

Plates 52 and 53 are similarly connected, by the solid cylindrical drive cam 65, larger than cam 55, the plates and cam being bored to receive spiral pins 66 and screw 67, as in the case of pins 56 and screws 57. A needle bearing or the like 68 is mounted on cam 65 and the drive link 70 has one end mounted on the bearing between washers 71, the elements just identified constituting the middle eccentric assembly.

Plates 53 and 54 are connected identically with the arrangement described in connection with plates 51 and 52, the cylindrical counterweight cam 75 being in axial alignment with cam 55 and counterweight link 80 having one end mounted on the needle bearing 78. Plate 54 may be provided with a pair of oil splashers 79 (one being shown) symmetrically mounted below the periphery of the plate.

The counterweight links 60 and 80 are connected to the counterweight ram 40 by means of the stud 82 (FIGS. 2 and 6) traversing vertically the ram, the ends of the links being provided with bearings, such as needle bearings 83, 84 and retention being assured by the provision of split locking rings 85, 86 adjacent the stud ends. The vertical position of the stud is maintained by the stud collar 87, resting on a flat on the upper surface of the piston.

The drive link 70 is connected to the drive ram 25 through the engagement of the link with a dowel pin 92 traversing the hollow interior of the piston. The end of link 70 has a longer vertical bore than the links 60 and 80 and is provided with two needle bearings 93, in tandem.

The lower stub axle 49 is provided with a fan 95 on a shaft 96 which fits in a recess in the end of the axle and is held in position by the screw 97. The bottom of the housing is longitudinally fluted, as indicated by the interior ridges 98 which extend forward and rearward from the recess 99 in which the fan is located, the recess being covered by the perforated fan guard 94.

The hydraulic motor 100 is connected to the upper stub axle 46 by the drive coupling 101. The driving fluid is supplied, from a suitable source, through a pressure conduit 102 and exits through the return conduit 103. The valve assembly (FIG. 4) includes the valve block 105 having a chamber 106 in which the spool valve piston 107 is slidable, the piston being biased upwardly by the spring 108 and movable downwardly by pressure on the pin 109. In its upper position the valve piston permits fluid entering at 110 to flow through passage 111, around the recessed middle portion 112 and to exit at 113, without actuating the motor. When the piston is depressed, its upper portion closes the passage 111 (with which the portion 112 is no longer in register), forcing the fluid to go to the motor through port 114, the return flow being through port 115, passage 116 and out at 113. A trigger lever 118 is pivotally mounted in the rear handle 119 with its forward end in a position to depress the pin 109 when the trigger handle is squeezed.

Provision is made for supporting the weight of the saw, in a customary manner, by attachment of a counterbalance cable to a selected hole in the bracket 120. A front handle 122 is attached to the housing and extends generally arcuately over the top and down one side of the housing, the front and rear handles and cable support making the manipulation of the saw relatively easy and under good control. The front handle is so attached to the housing that it can be reversed, for right hand or left hand operation.

The manner of operation of the saw can be readily understood from the foregoing description, but its advantages may appropriately be summarized.

The reciprocating masses are exactly matched, as are the rotary masses (by accurate proportioning of the elements in the crank assembly) so that the saw is capable of high speed reciprocation at very low vibration levels. It is in balance at all speeds, providing complete versatility of operation.

The hydraulic power supply is controlled and activated by a manually operated valve and manifold assembly which eliminates all need for electric supply or controls on or near the saw itself. The saw is thus safe to operate in the very wet environment where it is normally used.

The housing is closed, with a crankcase (in the lower portion of main housing 10) that has a certain level of lubricating oil and a flinger which throws the oil up onto the revolving and reciprocating members, providing constant lubrication for all the working parts. The finned or fluted configuration of the base provides a heat sink from which the fan can disperse the heat resulting from high speed operation.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What I claim is:

1. A reciprocating blade saw comprising a motor, a saw blade, a drive system and an elongated housing, the drive system including a crankshaft having three eccentric assemblies, a saw drive ram axially slidable in the forward portion of the housing, a counterbalance ram slidable in the rear portion of the housing coaxially with the saw drive ram, a drive link connecting the middle eccentric assembly to the saw drive ram and drive links connecting each other eccentric assembly to the counterbalance ram and straddling said counterbalance ram, said other eccentric assemblies being oriented 180° from the middle eccentric assembly and the mass of the counterbalance ram being substantially equal to the total mass of the saw blade and the saw drive ram.

2. A reciprocating blade saw according to claim 1 wherein each eccentric is constituted by an assembly including anti-friction bearing elements engaged with the respective drive links, the mass of the middle eccentric and saw drive link being substantially equal to the total mass of the other eccentrics and the counterbalance drive links.

3. A reciprocating blade saw according to claim 1 wherein the crankshaft is disposed vertically within the housing and the motor is mounted on the housing directly above the crankshaft.

4. A reciprocating blade saw according to claim 1 wherein the motor is hydraulic, and which includes valve mechanism permitting a continuous supply of hydraulic fluid under pressure to bypass the motor or to actuate the motor in response to operation of the valve.

5. A reciprocating blade saw according to claim 1 wherein the housing is enclosed to constitute a crankcase, the crankshaft being provided with at least one oil agitating device, whereby lubrication of the revolving and reciprocating parts is facilitated.

6. A reciprocating blade saw according to claim 1 wherein the crankshaft is provided with an externally located fan for heat dispersal.

7. A reciprocating blade saw according to claim 6 wherein the bottom wall of the housing is provided with ribs and the fan is located to circulate air past said ribs.

* * * * *